Feb. 27, 1934.                W. H. FREYGANG                1,948,753
               FIRE EXTINGUISHING MEDIUM DISTRIBUTION SYSTEM
                    Filed Aug. 6, 1930          10 Sheets-Sheet 1

INVENTOR
Walter H. Freygang.
BY Danby + Darby
ATTORNEYS.

Feb. 27, 1934.                 W. H. FREYGANG                    1,948,753
                   FIRE EXTINGUISHING MEDIUM DISTRIBUTION SYSTEM
                        Filed Aug. 6, 1930      10 Sheets-Sheet 2

INVENTOR
Walter H. Freygang.
BY Darby & Darby
ATTORNEYS.

Feb. 27, 1934.  W. H. FREYGANG  1,948,753
FIRE EXTINGUISHING MEDIUM DISTRIBUTION SYSTEM
Filed Aug. 6, 1930   10 Sheets-Sheet 3

INVENTOR
Walter H. Freygang
BY Darby + Darby
ATTORNEYS.

Feb. 27, 1934.        W. H. FREYGANG        1,948,753
FIRE EXTINGUISHING MEDIUM DISTRIBUTION SYSTEM
Filed Aug. 6, 1930        10 Sheets-Sheet 5

INVENTOR
Walter H. Freygang
BY Darby & Darby
ATTORNEYS

Feb. 27, 1934.    W. H. FREYGANG    1,948,753
FIRE EXTINGUISHING MEDIUM DISTRIBUTION SYSTEM
Filed Aug. 6, 1930    10 Sheets-Sheet 7

INVENTOR
Walter H. Freygang
BY
ATTORNEYS

Feb. 27, 1934.   W. H. FREYGANG   1,948,753
FIRE EXTINGUISHING MEDIUM DISTRIBUTION SYSTEM
Filed Aug. 6, 1930   10 Sheets-Sheet 8

Fig. 18.

INVENTOR
Walter H. Freygang
BY
ATTORNEYS.

Feb. 27, 1934.  W. H. FREYGANG  1,948,753
FIRE EXTINGUISHING MEDIUM DISTRIBUTION SYSTEM
Filed Aug. 6, 1930   10 Sheets-Sheet 9

Fig. 19.

INVENTOR
Walter H. Freygang.
BY Darby & Darby
ATTORNEYS

Feb. 27, 1934.　　　W. H. FREYGANG　　　1,948,753
FIRE EXTINGUISHING MEDIUM DISTRIBUTION SYSTEM
Filed Aug. 6, 1930　　　10 Sheets-Sheet 10

Fig. 20.

INVENTOR
Walter H. Freygang
BY
ATTORNEYS

Patented Feb. 27, 1934

1,948,753

UNITED STATES PATENT OFFICE 1,948,753

FIRE EXTINGUISHING MEDIUM DISTRIBUTION SYSTEM

Walter H. Freygang, Weehawken, N. J., assignor to Walter Kidde & Company, Inc., a corporation of New York Application August 6, 1930. Serial No. 473,333

5 Claims. (Cl. 169—11)

The present invention relates to a fire extinguishing system of the type in which the fire extinguishing medium is a fluid stored under pressure in limited quantities in one or more containers from which it is released into a distributing pipe system in case of fire. In view of the limited supply of fluid which may be a gas or a vaporizable liquid, such as liquid carbon dioxide, and the pressure under which it is stored, which pressure is a desirable factor in the rapid discharge of the fluid, escape of the fluid due to leakage must be absolutely avoided. Hence the fluid is stored in one or more containers, which experience has proved can be maintained leakage tight over long periods of time. The invention is, therefore, to be distinguished from gas fire extinguishing systems in which the gas is allowed to fill the distributing pipe system and from which it is discharged through sprinkler heads or some type of valve. In such systems experience has proved that it is not only difficult, but practically impossible to make the pipe system leakage tight over long periods of time.

The chief advantage of a fire extinguishing system employing a gas or varporizable fluid extinguishing medium under considerable pressure is that the expansion of the medium when discharged causes it to quickly fill the space on fire and to smother the fire by cutting off the supply of combustion supporting air. Gaseous mediums can, therefore, extinguish fires in the most inaccessible of locations. The pressure under which the medium is stored enables large quantities to be stored in small spaces and also results in rapid discharge with consequent rapid formation of a fire smothering atmosphere.

It is, therefore, an object of the present invention to provide a system of the type described which is automatically operable, but which may also be operated manually in the emergency.

In view of the cost of installations of this nature and the space required for the storage containers, it is desirable that the limited supply of fluid, which is calculated to be sufficient in quantity to handle a fire in the largest one of a plurality of spaces to be protected, be capable of being directed automatically to any one of the plurality of spaces. It is, therefore, an object of the present invention to provide a system of the type described with means to automatically distribute the extinguishing fluid to the proper one of a plurality of spaces to be protected by a given limited supply of the fluid.

It is desirable and in many cases required by the National Board of Fire Underwriters that the operation of fire extinguishing systems be mechanical as distinguished from electrical, so that operation thereof may be entirely independent of sources of electrical energy which may fail at the crucial moment. It is, therefore, an object of the present invention to provide a system of the type described in which operation is effected by a non-electrical heat responsive device.

In view of the fact that heat responsive devices employing fusible or combustible elements sometimes do not act as quickly as desirable, it is an object of the present invention to provide a non-electrical system with a device responsive to the increase in pressure of an enclosed body of air, which becomes heated in the presence of fire.

In order to obtain a still quicker release of the extinguishing fluid, it is an object of the present invention to provide an air pressure system of this type with a rate of rise device responsive to the rate of increase in pressure of an enclosed body of air which is normally vented to the atmosphere by a minute vent which relieves any pressure developed by a gradual rise in pressure due to climatic changes, but which will not relieve rapid increases of pressure developed upon the occurrence of fire. In this connection, see the United States Patent #1,269,556.

It is also an object of the present invention to provide systems of the types described with gravity-operated valves and gas release means as being most effective in the preferred mechanical type of system.

A further object is to provide a system in which the gas release means is pressure-operated but gravity-initiated.

A further object is to provide a system in which the operation of any distributing valve initiates the operation of the gas release means.

These and many other objects, as will appear from the following disclosure, are secured with the use of this invention.

This invention resides substantially in the combination, construction, arrangement, and relative location of parts, all as will be described in greater detail hereinafter.

Referring to the drawings—

There are now known in the art automatic and manually operable fire extinguishing systems employing fire extinguishing gas. The general object of this invention is the provision of a system of this type which has many novel features and which at the same time eliminates many of the disadvantages of prior systems. Rather than describe these features and advantages in the abstract reference will be made directly to the drawings where these features will be developed in connection with the detailed description of the system.

Figure 1:
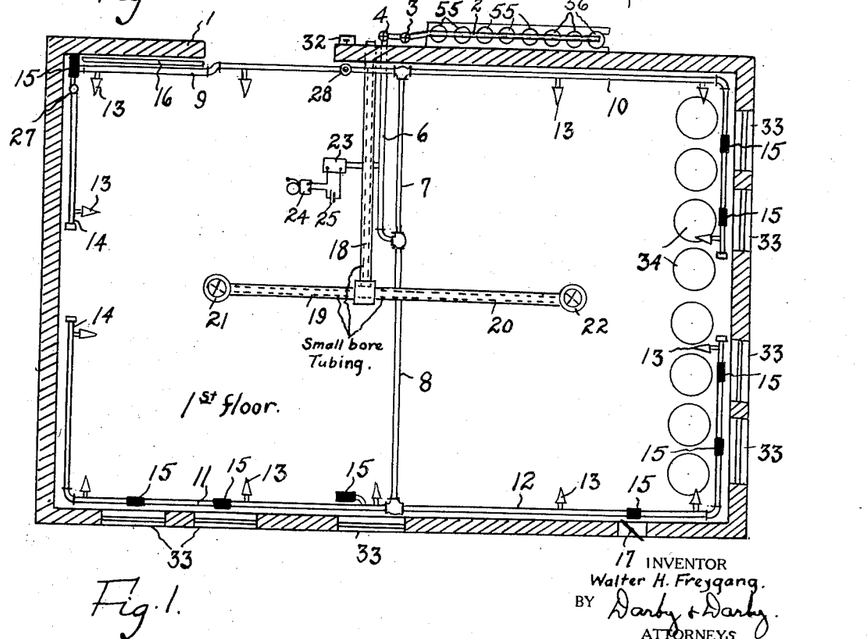
Figures 1 and 2 represent two floors of a building to which this invention has been applied.
Figure 2:
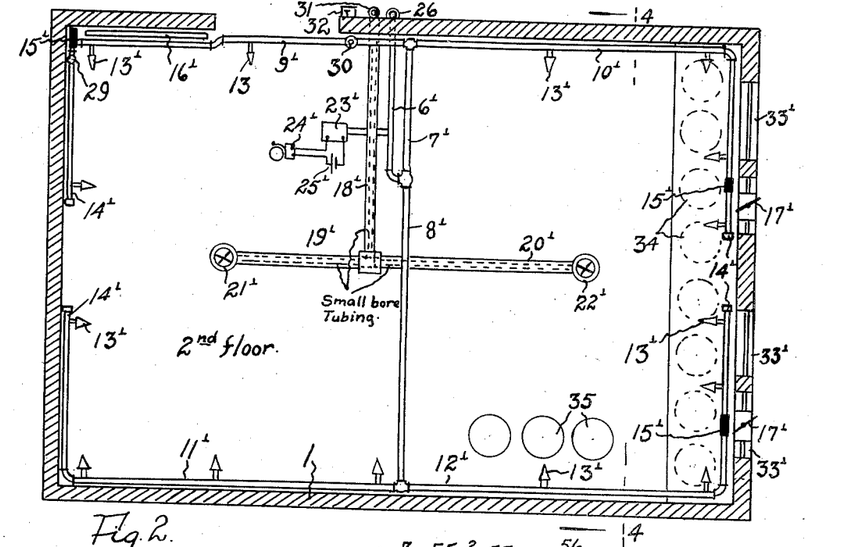
Figure 3:
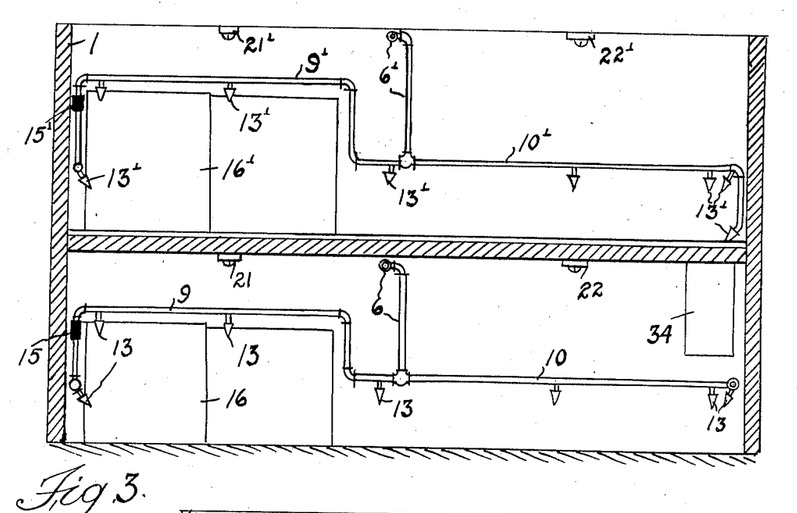
Fig. 3 is a vertical sectional line through such a building.
Figure 4:
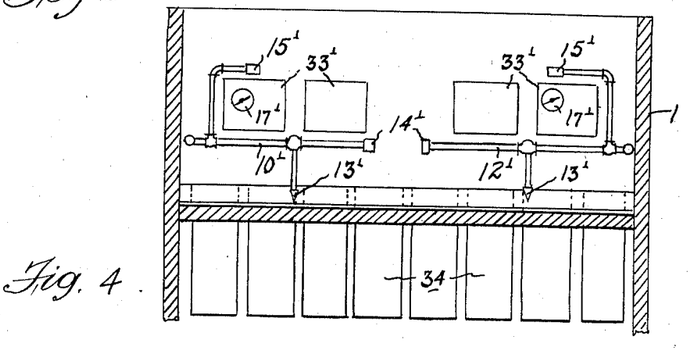
Fig. 4 is a sectional view taken on the line 4—4 of Fig. 2.

The system of the invention has been shown as applied to a two story building comprising two large rooms. The system can, of course, be applied to any space which it is desired to protect against fire and besides buildings it may be applied to vessels, power plants, electric generators, and in fact to any space to be protected. Fig. 1 shows the first floor plan and Fig. 2 shows the second floor plan. The building is indicated diagrammatically and generally at 1 and is shown provided with a number of window openings 33 on the first floor and 33' on the second floor. The building is also shown with one doorway controlled by a door 16 on the first floor and a door 16' on the second floor. The first floor is shown with a ventilating damper 17 in the wall and the second floor is shown with ventilating dampers 17' in some of the windows. These elements have been shown to illustrate the feature of this invention of pressure operated devices for closing the doors and windows and shutting the ventilating dampers in case of fire. There has been shown supported on the outside of the building in Fig. 1 the fire extinguishing gas containers 55 and 56. These containers have been shown on the outside of the building for the obvious reason that thereby they are kept out of the space which is liable to fire conditions. They can, of course, be placed at any desired point either in the building, on the roof, or in the cellar. The association of the elements has, of course, been shown diagrammatically in Figs. 1 to 4, inclusive, because the actual arrangement is gone into in greater detail in the following figures.

Pipe 2 connects these containers to the distribution system and is provided with the valves 3 and 4. Valve 4 controls pipe 6 on the first floor which is connected to the distribution system comprising pipes 7, 8, 9, 10, 11 and 12. Valve 3 controls branch pipe 26 leading to the second floor which has a connection 6' connected to the distributing system comprising the pipes 7', 8', 9', 10', 11' and 12'. It is, of course, apparent that the distribution system may have any desired form and can extend to any points in the room which need to be particularly protected. On the first floor there are provided a plurality of gas discharge nozzles 13 and on the second floor gas discharge nozzles 13'. At each closed end of the system there is provided an extension 14 beyond the last nozzle which is called a dust leg and is provided for blowing out the distribution system from time to time to remove scale and dirt therefrom. The system can be blown out either by compressed air or by the extinguishing gas itself. At the proper points in the distribution system there are provided on the first floor the pressure operated trip devices 15 and, likewise, pressure operated trip devices 15' are provided on the second floor. These devices are provided adjacent the windows it is desired to control, the ventilating dampers, and the doors.

At 18, 19 and 20 on the first floor and 18', 19' and 20' on the second floor are the protecting pipes for the small bore tubes which are used in connection with the air pressure operated release device of the type such as disclosed in the Lowe Patent No. 1,269,556. This device is also known as "a rate of rise heat actuated device". These small tubes extend to the heat actuated elements 21 and 22 on the first floor and 21' and 22' on the second floor. These heat actuated elements are also disclosed in the above patent to form part of that system. There has been diagrammatically illustrated at 23 on the first floor and 23' on the second floor the pressure operated switch which controls the circuits for the signal devices 24 and 24' and the current sources 25 and 25' respectively. It is, of course, understood that these signal devices 24 and 24' are located at some central control point, such for instance as at the watchman's station, to give a signal to him not only that a fire has occurred but that the gas extinguishing medium has been released within the space in which the fire condition exists. At 27 and 28 on the first floor and 29 and 30 on the second floor are branches of the fire extinguishing system which may extend vertically in either direction. These are merely illustrative to show that the distribution system may have any desired form. At 31 in Fig. 2 is the protecting pipe and the small bore tubing which runs down from the second floor to the point where the release devices are located. At 32 on each floor is a manually operable handle which extends to the release devices so that the extinguishing gas may be released in case of fire even before the pressure operated devices automatically initiate the operation of the system. At 34 and 35 have been indicated diagrammatically devices which may be a particular fire hazard to show how the nozzles 13 and 13' may be located with respect thereto so that the fire extinguishing gas may be projected directly thereon.

Figures 5, 6, 7, 8:
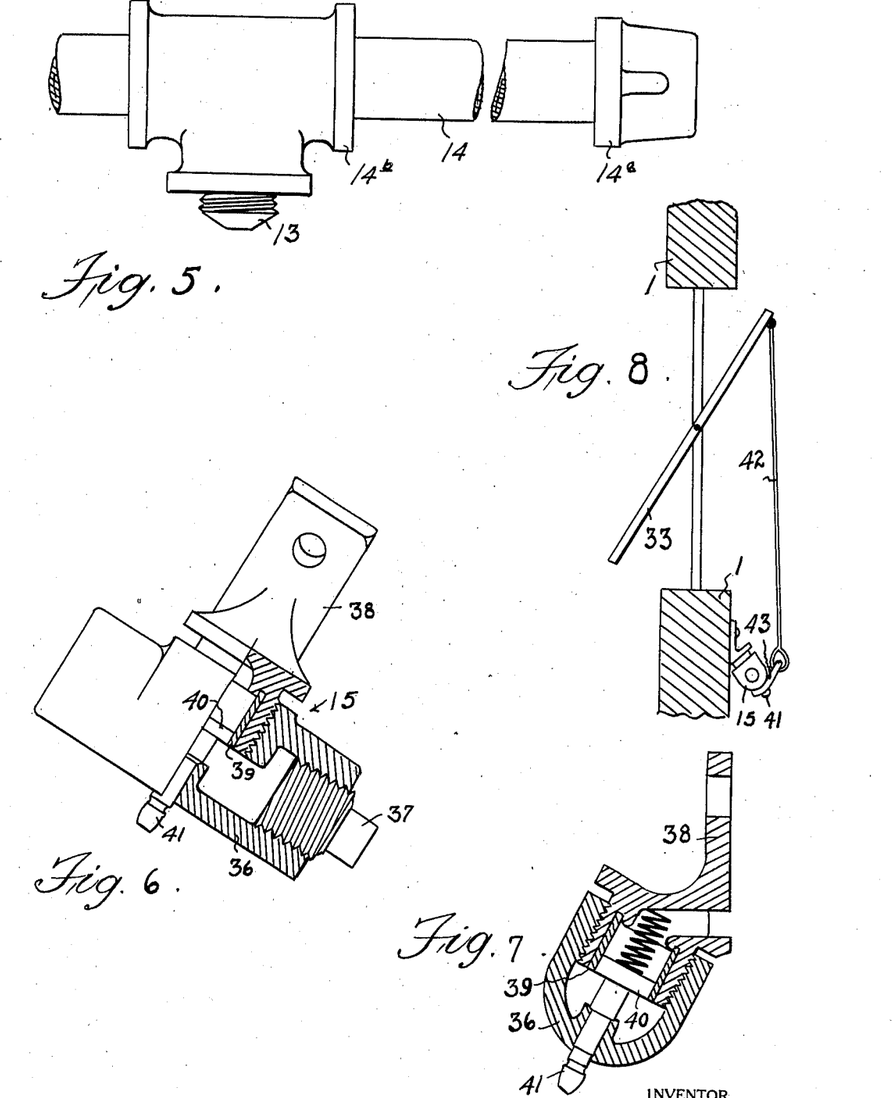
Fig. 5 is an enlarged detail view of a so-called dust leg.
Fig. 6 is a view partly in section of a pressure operated trip device.
Fig. 7 is a cross-sectional view.
Fig. 8 is a view showing the manner in which the pressure operated trip is applied to a window.

The dust leg, although known in the art, has been shown in enlarged form in Fig. 5, as well as one of the discharge nozzles. The distributing pipe has the discharge nozzle 13 therein through which the fire extinguishing gas is delivered and extending therebeyond is the dust leg 14 which is closed by means of a cap 14$^a$. Into this leg is blown any dirt or dust which may collect in the pipe line due, for example, to corrosion. It is desirable to keep the pipes clean in order that the nozzles may not be clogged up and it is customary periodically to blow the pipe lines out with compressed air or the extinguishing gas itself to insure that the system is in operative condition.

The pressure operated trip device is shown comprising a casing 36 which receives the pipe that connects it to the system at one end and which is closed at the other end by means of a plug 37 when the pressure trip device is at the end of a pipe line. When connected directly in a continuing pipe line, the pressure trip device casing 36 receives a pipe connection at both ends to provide a passage straight through it. This casing is provided with a suitable supporting bracket 38. Within the casing is a small cylinder 39 in which operates a piston 40. The piston 40 is provided with a small piston rod 41 which projects from the casing 36 and is provided with a groove near one end. This piston 40 is normally held so that the rod 41 projects by means of a spring as shown in Fig. 7.

The manner of associating such a device with a window is shown in Fig. 8. Secured to the window is a cord or cable 42 which is provided with a ring 43, which ring fits over the rod 41 and lies in the groove on the under side thereof. The type of window shown is such that when the pin 41 is withdrawn from ring 43 it may fall closed by gravity. Similar devices are used for shutting the dampers, closing the doors and for actuating any other device, either to open or close it, start it or stop it when a fire occurs.

Figures 9, 10, 14:
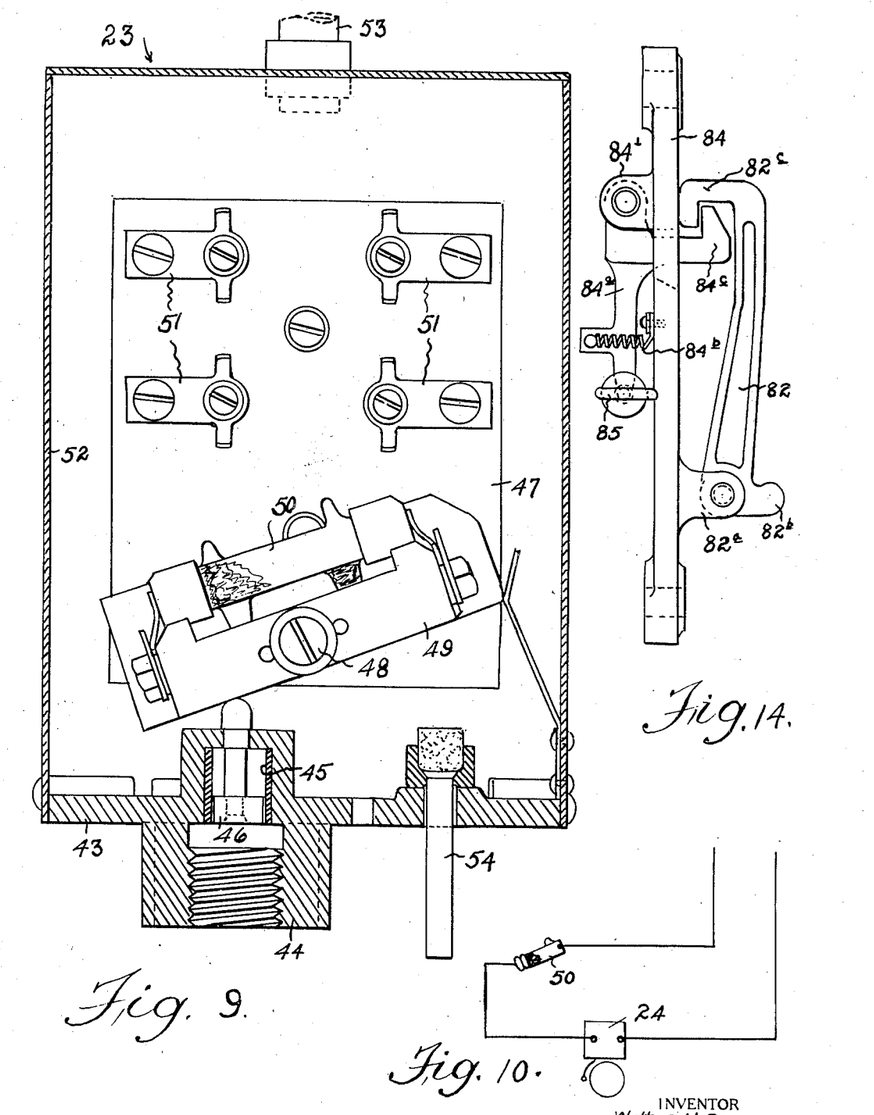
Fig. 9 is a sectional view through the casing of the pressure operated switch which controls the signal circuits.
Fig. 10 is a simple diagrammatic view of the signal circuit.
Fig. 14 is a side elevational view of the release device which is constructed so as to be operable automatically by the system or manually when desired.

The pressure operated switch which controls the signal device is shown in Fig. 9. The form set forth is of the mercury type. It comprises a base 43 having a bored internally threaded hub 44 by means of which it is connected through a pipe to the distribution system. A small cylinder 45 is provided in which a piston 46 operates. This piston has a projecting piston rod, as shown. Within the casing 52 is a suitable support 47 on which is pivotally supported at 48 the mercury switch base 49. This base supports in suitable grips a mercury switch cartridge 50 of any well known type. At 51 are terminal connections shown in duplicate by means of which more than one signal device may be connected to the switch if desired. The top of the casing 52 is provided with a pipe 53 through which the signal circuit wires may extend their protection. The piston rod engages the cartridge support 49 and when piston 46 moves upwardly it causes support 49 to rotate so that the mercury in the cartridge will complete the circuit in the usual manner.

At 54 is a manually operated plunger for returning the switch to the position shown in the figure, which is the position in which this switch opens the circuit it controls. A leaf spring is provided to hold the switch in its normal position. The circuit for the signal device is shown in Fig. 10. The cartridge 50 controls this circuit and a signal device, such as a bell, has been shown at 24. The two wires run to a suitable current source.

Figure 11:
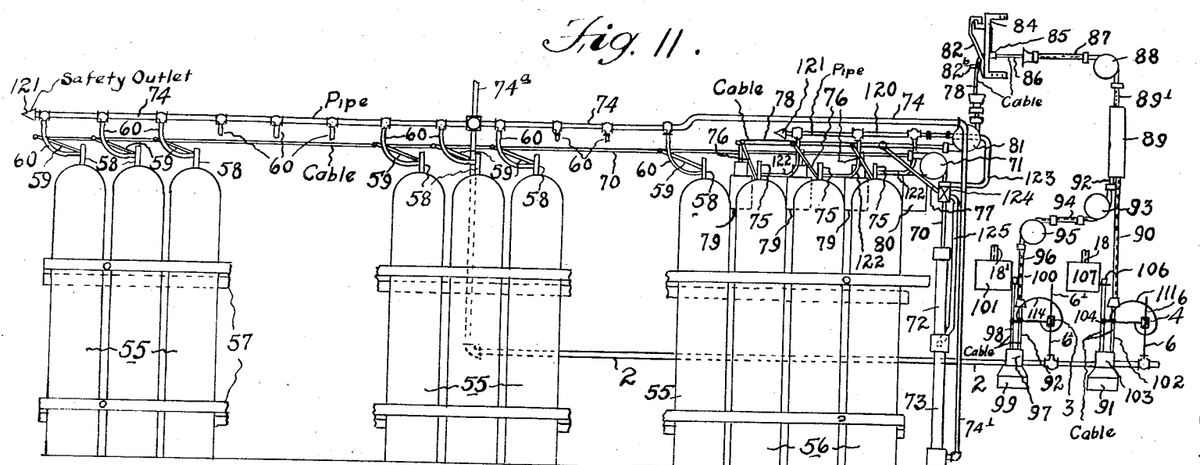
Fig. 11 is a diagrammatic view of the main part of the system showing the way in which the system is set in operation and the gas released from its containers.

The general combination comprising the part of the apparatus to be connected to the distributing system is shown in Fig. 11. The main group of containers for the carbonic acid gas, which is normally held therein in the form of a liquid, is shown at 55, while the auxiliary group by means of which the gang pressure release device is operated as shown at 56. Of course the number of cylinders varies with the size of the space to be protected and the amount of gas it is desirable to have on hand. These containers are held in suitable racks 57. Each container is provided with a valve as has been indicated diagrammatically. The containers 55 are provided with the valves 58 and the containers 56 are provided with the valves 75. These valves are operated by means of levers 59 and 76 which are secured to the valve stems and to operating cables 70 and 78. The containers 55 are connected by pipes 60 to the pipe manifold 74 and the containers 56 are connected to the pipe manifold 120 by means of the connecting pipes 122.

Figures 12, 13:
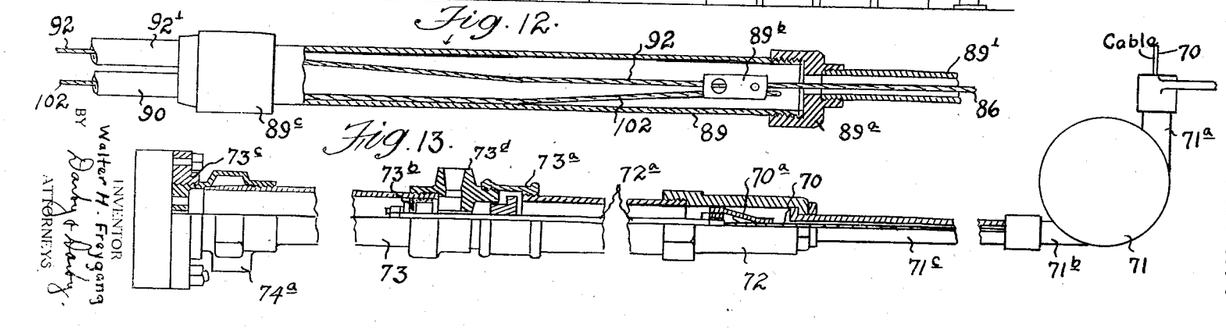
Fig. 12 is a view partly in section of the multiple pull mechanism.
Fig. 13 is a view partly in section of the pressure gang release device.

Pipe 2 connects the distributing system with the manifold 74. Cable 70 passes around the corner pulley 71 and is attached to the piston within the pressure gang release device, as clearly shown in Fig. 13. The details of this feature are clearly shown in Fig. 13 where the corner pulley 71 is shown comprising a casing having the cable guides 71$^a$ and 71$^b$. The pressure gang release device comprises a cylinder 73 secured to the base 73$^c$. In this cylinder is slidably movable a piston 73$^b$ which is connected by a piston rod 72$^a$ in the coupling device 70$^a$ to the cable 70. At 74$^a$ is an outlet from cylinder 73, while the pressure supply pipe is connected at the point 73$^d$. Secured to the cylinder 73 by the coupling nipple 73$^a$ is a protecting casing 72 for the piston rod and cable. A protecting pipe 71$^c$ extends from this casing to the corner pulley. Cable 78 extends around a similar corner pulley 81 and attaches a hook 82$^b$ on the release device 84 which will be described in detail later. Pipe 120 is connected by branch 123 to a valve 124, which in turn is connected by pipe 125 to cylinder 73 at the point 73$^d$ (Fig. 13). Valve 124 is provided with an operating lever 77 which is also connected to cable 78. Attached to cable 78 at the point where the corresponding lever is secured thereto are the weights 79 and 80. Pipe 74 is connected by branch 74' to the point 74$^a$ to the cylinder 73 (Fig. 13). Each pipe manifold 74 and 120 is provided with a safety outlet device 121. These devices are well known in the prior art and comprise in one form a thin disc of frangible material which breaks above a predetermined pressure to permit the escape of gas so as not to strain the system.

Secured to the releasing device 84 is a cable 86 which passes through a protecting pipe 87, around corner pulley 88, through protecting pipe 89' into the multiple pull mechanism 89. Here, as shown in Fig. 12, cable 86 is provided with two branches 92 and 102. Branch 92 passes around corner pulley 93 through a protecting pipe 94, around corner pulley 95, and through protecting pipe 96, to weight 97 to which it is attached. Weight 97 rests upon another weight 99 which is connected by a cable 98 to the compressed air operated releasing device 101. Branch 102 of the cable passes down through protecting pipe 90 and is attached to weight 103. Weight 103 rests on weight 91 which is attached by cable 104 to the compressed air releasing device 107. As shown, pipe 2 has the two branch leads 6 and 6' which extend to the first and second floor distributing systems, respectively. In pipe 6 is the valve 4 and in pipe 6' is the valve 3. Valve 4 is provided with an operating sector 111 which is attached to cable 104 and can be operated thereby. Likewise, valve 3 is connected to sector 114 which is attached to cable 98 to be operated thereby.

Figure 15:
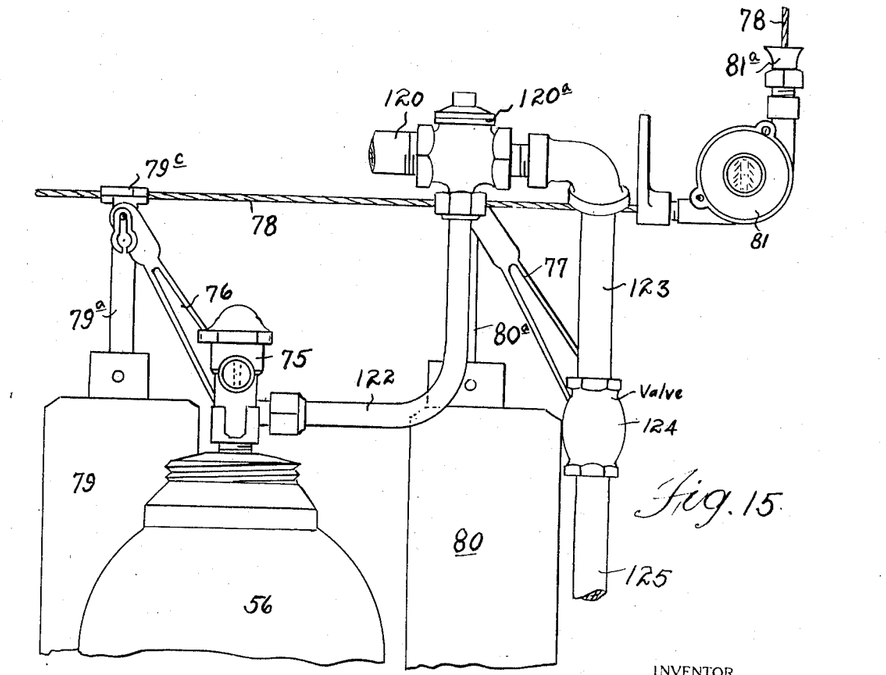
Fig. 15 is an enlarged side elevational view of the containers, valve thereon, and the mechanism by means of which they are operated including the arrangement for operating the valve which supplies gas to the pressure gang release device.
Figure 16:
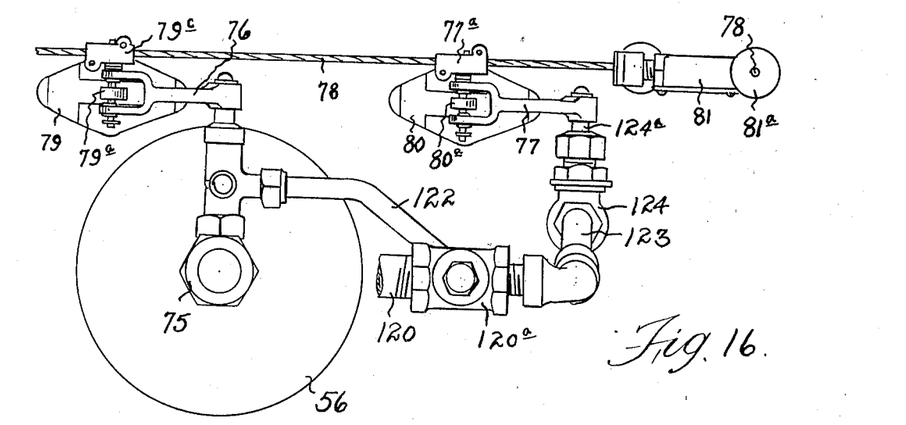
Fig. 16 is a top plan view of these parts.

Referring to Figs. 15 and 16, the method of attaching the levers for operating the valves and the weights to the cables is shown. These views are in connection with the structure used with containers 56. The same construction is used with containers 55 but the weights are omitted. Container 56 is shown provided with the valve 75 which has attached to its stem the operating lever 76. This operating lever and the link 79a of the weight 79 are attached to cable 78 by means of a clamping device 79c. The valve stem 124a of valve 124 is connected by a lever 77 to cable 78 by means of a similar clamp 77a. The weight 80 is likewise attached by means of the link 80a to this clamp. The discharge side of valve 75 is connected by pipe 122 to the coupling T 120a which unites pipes 120 and 123. The corner pulley construction is shown clearly in Fig. 15 in which the protecting pipe at the point of issuance of the cable is provided with a so-called cable flare 81a.

Figure 17:
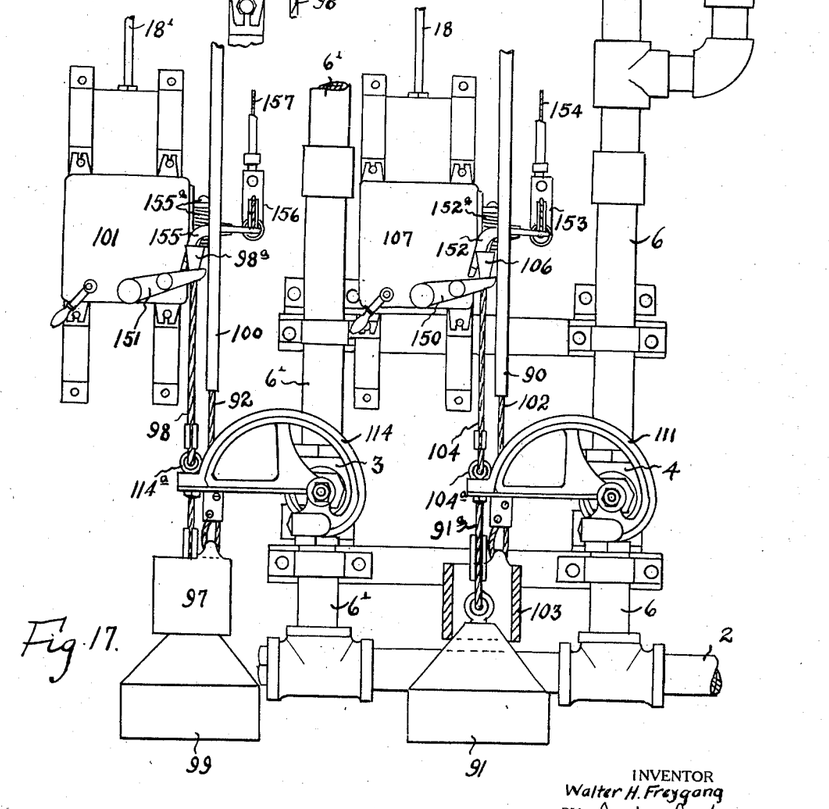
Fig. 17 is an enlarged elevational view of the details of the release devices.
Figure 18:
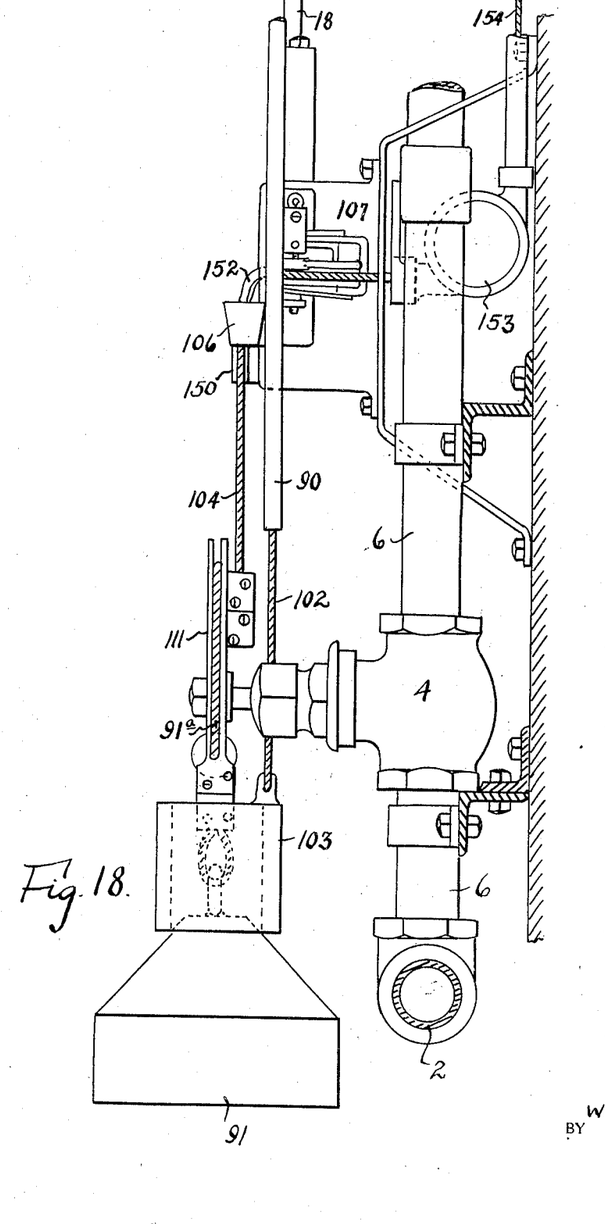
Fig. 18 is an end elevational view of the parts.

The details of the weight supporting mechanism which operate valves 3 and 4 are shown in Figs. 17 and 18. At 101 and 107 are the compressed air operated devices which are attached to the heat actuated devices 21, 22, 21' and 22', respectively (Figs. 1 and 2). These devices are disclosed in the above mentioned Lowe patent and comprise by themselves no part of this invention. The sector attached to the valve stem of valve 4 is in the form shown and is attached by means of an eyebolt 104a to cable 104. This cable is provided with a button 106 at the end, which cable fits into the slotted end of lever 150. Eyebolt 104a and its nut fit in the slotted end of sector 111.

Pivotally supported at 152a and held in the position shown by the spring is a crank 152 having a projecting arm which lies in back of the button 106. The other end of this crank is connected to cable 154 which extends around the corner pulley 153. Weight 91 is attached to sector 111 by a short length of cable 91a which lies in a groove on the circumference of the sector. Cable 102, which passes through pipe 90, is connected to the cylindrical weight 103 which rests on weight 91. The branch pipe 6 extends to the distribution system of floor 1 and is provided with the pressure operated switch for the signal circuit as shown at 23. In an alternative arrangement the pressure operated switch can be connected to branch 74a (Fig. 11) of the main manifold. In a similar way cable 98 is connected to an eyebolt 114a to support sector 114 mounted on the valve stem of valve 3. Weight 99 is attached to sector 114 at the circumference as described in connection with weight 91. Cable 92 in the projecting pipe 100 is attached to the cylindrical weight 97 which rests on the weight 99. The upper end of cable 98 is provided with a button 98a, which cable fits in the slotted end of lever 151 on the compressed air operated device 101. As before, the crank 155 is pivotally mounted at 155a and held in the position shown by a spring. This crank has a projecting arm which lies in back of the button 98a. The other end of the crank is attached to cable 157 which passes around the corner pulley 156. Pipe 6' extends to the distribution system of the second floor, and likewise, may be provided with a pressure operated switch for the signal control circuit. The devices 101 and 107 are described in detail in the Lowe patent and may be briefly stated to consist of mechanism which is operated by the compressed air generated in the piping systems 18' and 18, respectively, when the temperature in the space to be protected is raised by a fire.

Figure 19:
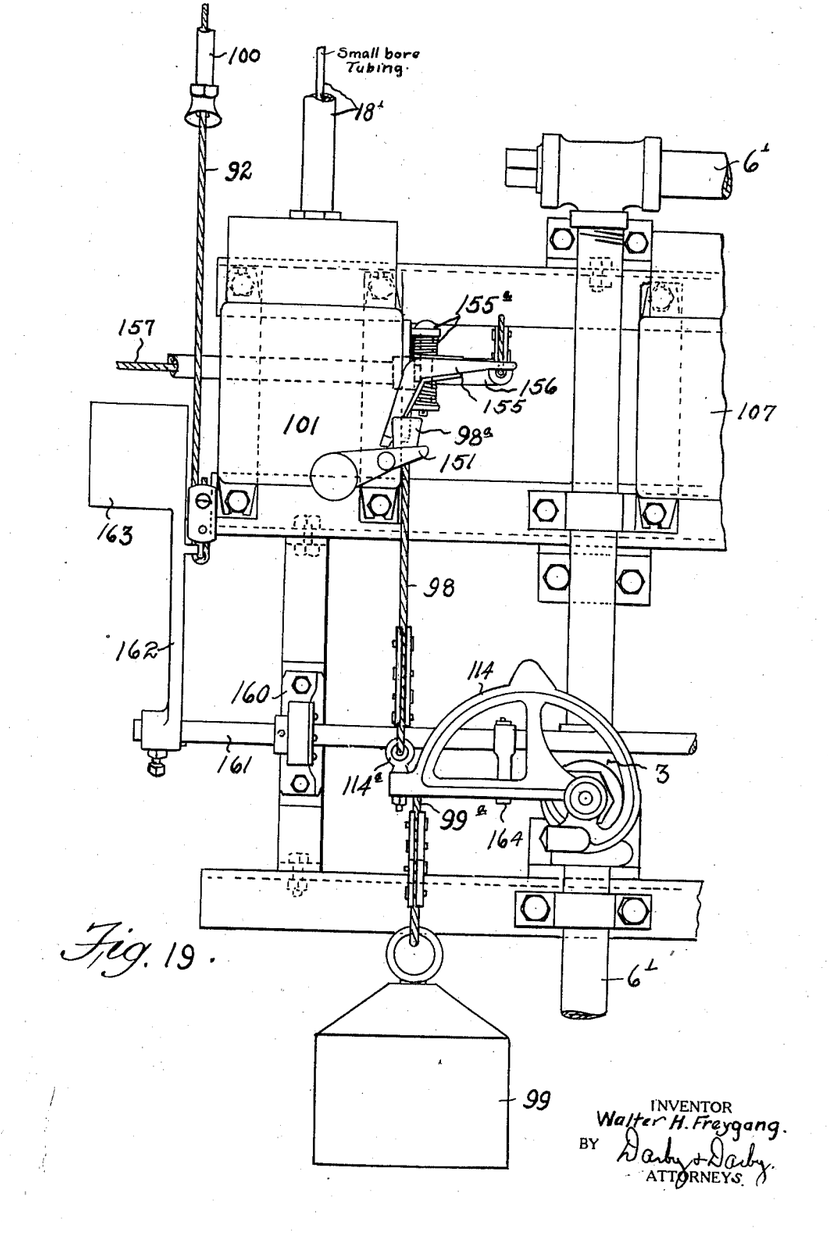
Figs. 19 and 20 are similar views of a modified arrangement.
Figure 20:
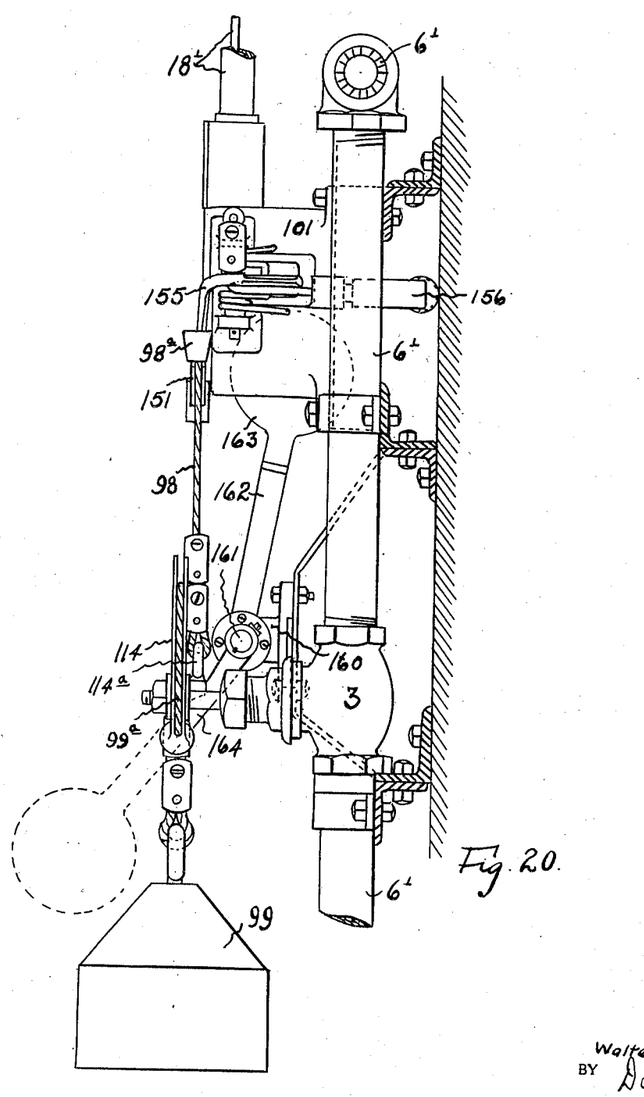

A slightly modified form of structure corresponding to that in Figs. 17 and 18 is disclosed in Figs. 19 and 20. In this case only one-half of the mechanism is shown in detail since the parts are the same. Cable 98, as before, connects by the eyebolt 114a to sector 114 secured to the valve stem of valve 3. Secured to this sector and lying in a groove on the circumference thereof (Fig. 20) is the cable 99a which is attached to weight 99. Rotatably supported on the bearing 160 is a shaft 161 which is provided with a lever 162 having a large weight 163 on the end thereof. In this case cable 92 is attached to the lever 162, as shown. A short arm 164 is secured to shaft 161 and is arranged so as to be rotated by the sector 114 when weight 99 is released. The compressed air operated device is constructed as before and clearly shows in this figure the manner in which the small bored tubing extends through the upper pipe for protection. In this case a lever 155 is attached to cable 157 which passes around the corner pulley 156 and extends in a direction at right angles to the direction in which it extends in the other arrangement.

Figure 21:
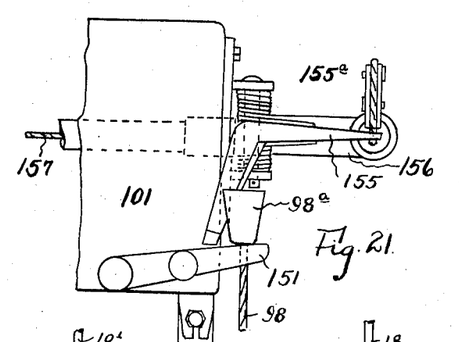
Fig. 21 is an enlarged detail view.

Fig. 21 shows the details of this arrangement in enlarged form.

The releasing device to which the various cables are secured is clearly shown in Fig. 14. It comprises a supporting plate 84 which has lugs 84' thereon to pivotally support a bell crank lever which comprises the arms 84a and 84c. Arm 84a is attached by means of a spring 84b to the supporting plate to hold this bell crank lever in the position shown. The outer end of arm 84a is provided with an eyebolt 85. The outer end of arm 84c is made in the form of a hook as shown. Pivotally supported on plates 84 by means of the lugs 82a is a lever 82 which is provided at one end with a projecting lug 82b and is formed into a hook at 82c. The two hooks engage, as shown, to hold the parts in their normal position as depicted. As shown in Fig. 11, cable 78 is attached to the lug 82b and cable 86 is attached to eyebolt 85.

A description of the operation of this system will now be given. The system under normal conditions has its parts in the position indicated in Fig. 11 at which time there is no extinguishing medium in any of the pipe system since it is held locked in the containers 55 and 56.

Assuming, for example, that a fire breaks out on a floor of one of the buildings, the heat generated thereby raises the pressure of the air in the heat responsive devices 21 or 22. This pressure is communicated through the small bored tubing to the compressed air operated device 107. This actuates the device to release lever 150 (Fig. 17) so that it may rotate in a clockwise direction. As a result the cable 104 slips off the end thereof releasing weight 91. This weight causes sector 111 to rotate in a counter-clockwise direction, causing valve 4 to open. The downward movement of weight 91 releases weight 103 so that it pulls downwardly on cable 102. This pull on cable 102 is transmitted to the cable 86 through the multiple pull mechanism and finally to arm 84ª of the bell crank lever through the eyebolt connection 85. This causes the hooked end of the bell crank lever to rotate in a clockwise direction (Fig. 14) releasing lever 82. This lever 82 rotates in a clockwise direction permitting cable 78 to slip off the lug 82ᵇ. The release of this cable permits weights 79 and 80 to pull downwardly on the corresponding levers 76 and 77. As a result valves 75 and 124 are opened. Gas then escapes from cylinders 56 into the manifold 120 through branch 123, valve 124, and pipe 125 to cylinder 73 at its upper end. The pressure of this gas acting on the piston 73ᵇ in the cylinder causes the piston to move downwardly pulling with it cable 70. This pull on the cable causes all of the valves 58 of the containers 55 to be opened through the agency of levers 59. As a result the gas escapes from these cylinders into manifold 74 and from there to pipe 2. The gas may then escape from pipe 2 through branch 6 since valve 4 is already open and from thence to the pipe distributing system on the first floor. When piston 73ᵇ moves down to uncover port 74ª the gas in cylinder 73, having accomplished its work, may escape through pipe 74' into manifold 74 and thence to the distributing system to do useful work in extinguishing the fire.

As soon as gas pressure is created in pipe 6 the pressure operated switch 23 is closed completing the signal circuit and causing the signal device to give an indication that the fire extinguishing gas has reached the distributing system. If desired such switch may be connected into the distributing system right in the space to be protected and the signal circuit extended back to the control station but it is preferable to use the arrangement shown in Fig. 17 thus eliminating danger of interruption of the electrical circuit by a fire. When the fire extinguishing gas reaches the distribution system in the space to be protected it operates any of the pressure trip devices connected thereto to close the doors and the windows, to shut the ventilating dampers and to operate or stop the operation of any devices which might aid the fire.

These same operations may be effected manually by a guard or watchman pulling on either cables 154 or 157, depending upon which floor the fire occurs. By pulling on these cables the corresponding lever 152 or 155 is caused to rotate to force button 106 or 98ª off its supporting arm thereby releasing weight 91 and causing the apparatus to operate as before. A suitable pull handle or lever to be attached to these cables may be extended to any desired point or points as has been indicated at 32 in Figs. 1 and 2. It is apparent from Fig. 12 that regardless of which weight 91 and 99 is released to pull thereof is transmitted to cable 86 through the multiple pull mechanism so that if a fire occurs on either one or both of the floors the apparatus is sure to work.

In the modified arrangement shown in Figs. 19 and 20 when the fluid pressure operated device 101 is actuated lever 151 is released so that cable 98 may slip therefrom. As a result weight 99 causes sector 114 to rotate in a counter-clockwise direction opening valve 3. At the same time shaft 161 is caused to rotate by the pressure of the sector 114 on the arm 164. This causes lever 162 to rotate far enough so that weight 163 is past the center. This lever 162 rotates in a counter-clockwise direction, when viewed as in Fig. 20. Weight 163 then pulls on cable 92 which, as before, is connected to the eyebolt 85 of the release device. The operations then proceed as before. This mechanism can also be operated manually by pulling cable 157 which causes lever 155 to kick cable 98 free of lever 151.

From the foregoing description it will be seen that this system embodies the important objects pointed out at the beginning. In the first place, the fire extinguishing medium is confined within containers and does not reach the distribution system until a fire occurs. The main bank of containers is controlled by a gas pressure operated device which is supplied from a similar group of containers. This gas after doing its work is delivered into the distribution system to do further work in fire extinguishing. As soon as the fire extinguishing medium reaches the distribution system or passes the gas release devices a signal is operated at the control or guard station to indicate that fact. Pressure operated trips connected to the distribution system operate to close the doors and windows and actuate or stop any other devices which would aid the fire. In general then this system automatically supplies a fire extinguishing gas to any spaces provided therewith to extinguish a fire and is under the control of temperature pressure operated devices which initiate the operation of the system. In addition, the system may be initially set in operation manually. In addition to these features many other advantages and objects of the invention will be apparent from this detailed disclosure.

This invention resides in certain principles of construction and operation which have been illustrated and described in connection with one physical form. As is apparent to those skilled in the art they can of course be embodied in other physical forms without the departure therefrom and I do not wish to be strictly limited for this reason to the disclosure but rather to the scope of the appended claims.

What I seek to secure by United States Letters Patent is:

1. In a fire extinguishing system comprising a container of fire extinguishing fluid under pressure, a plurality of spaces to which the fire extinguishing fluid is to be conducted, a common conducting means for conducting the fire extinguishing fluid from the container, a separate branch conductor from the common conducting means leading to each place of use, a releasing device for releasing the fire extinguishing fluid from the container into the common conducting means, said releasing device being normally urged to the released position, means for restraining the operation of the releasing device, means in each branch conductor for normally closing off each place of use from the common conducting means, each closing off device being normally urged to the open position, means for restraining the opening of each closing off device, and means for rendering ineffective the means restraining the opening of one of the closing off devices, the means restraining the operation of the aforesaid releasing device being rendered ineffective by the opening of any one of the closing off devices.

2. In a fire extinguishing system comprising a container of fire extinguishing fluid under pressure, a plurality of spaces to which the fire extinguishing fluid is to be conducted, a common conducting means for conducting the fire extinguishing fluid from the container, a separate branch conductor from the common conducting means leading to each place of use, a releasing device for releasing the fire extinguishing fluid from the container into the common conducting means, weight actuated means normally urging the releasing device to the released position, means for restraining the operation of the weight actuated means, means in each branch conductor for normally closing off each place of use from the common conducting means, second weight actuated means normally urging each closing off device to the open position, means for restraining the operation of the second weight actuated means, and means for rendering ineffective the means restraining the operation of the second weight actuated means, the means restraining the operation of the first weight actuated means being rendered ineffective by the operation of any one of the second weight actuated means.

3. In a fire extinguishing system comprising a container of fire extinguishing fluid under pressure, a plurality of spaces to which the fire extinguishing fluid is to be conducted, a common conducting means for conducting the fire extinguishing fluid from the container, a separate branch conductor from the common conducting means leading to each place of use, a releasing device for releasing the fire extinguishing fluid from the container into the common conducting means, weight actuated means normally urging the releasing device to the released position, means for restraining the operation of the weight actuated means, means in each branch conductor for normally closing off each place of use from the common conducting means, second weight actuated means normally urging each closing off device to the open position, means for restraining the operation of the second weight actuated means, means for rendering ineffective the means restraining the operation of the second weight actuated means, and a third weight actuated means to render ineffective the means restraining the operation of the first weight actuated means, the third weight actuated means being rendered effective by the operation of a second weight actuated means.

4. In a fire extinguishing system comprising a container of fire extinguishing fluid under pressure, a plurality of spaces to which the fire extinguishing fluid is to be conducted, a common conducting means for conducting the fire extinguishing fluid from the container, a separate branch conductor from the common conducting means leading to each place of use, a releasing device for releasing the fire extinguishing fluid from the container into the common conducting means, weight actuated means normally urging the releasing device to the released position, means for restraining the operation of the weight actuated means, means in each branch conductor for normally closing off each place of use from the common conducting means, second weight actuated means normally urging each closing off device to the open position, means for restraining the operation of the second weight actuated means, means for rendering ineffective the means restraining the operation of the second weight actuated means, and a third weight actuated means to render ineffective the means restraining the operation of the first weight actuated means, the weight of the third weight actuated means being designed to rest upon the weight of the second weight actuated means and to render ineffective the means restraining the operation of the first weight actuated means upon movement of the weight of a second weight actuated means.

5. In a fire extinguishing system comprising a container of fire extinguishing medium under pressure, a plurality of spaces to which the fire extinguishing medium is to be conducted, a common conducting means for conducting the fire extinguishing medium from the container, a separate branch conductor from the common conducting means leading to each place of use, a releasing device for releasing the fire extinguishing medium from the container into the common conducting means, weight actuated means normally urging the releasing device to the released position, means for restraining the operation of the weight actuated means, means in each branch conductor for normally closing off each place of use from the common conducting means, second weight actuated means normally urging each closing off device to the open position, means for restraining the operation of the second weight actuated means, a rate of rise heat actuated means for rendering ineffective the means restraining the operation of the second weight actuated means, and a third weight actuated means to render ineffective the means restraining the operation of the first weight actuated means, the third weight actuated means being rendered effective by the operation of a second weight actuated means.

WALTER H. FREYGANG.